US00RE36340E

United States Patent [19]

Woodson et al.

[11] E Patent Number: Re. 36,340

[45] Reissued Date of Patent: Oct. 12, 1999

[54] CENTRIFUGALLY CAST PIPE

[75] Inventors: Charles S. Woodson, The Woodlands, Tex.; Michael J. Darnall; Norman A. Deumite, both of Baton Rouge, La.

[73] Assignee: A. O. Smith Corporation, Milwaukee, Wis.

[21] Appl. No.: 08/895,396

[22] Filed: Jul. 16, 1997

Related U.S. Patent Documents

Reissue of:

[64] Patent No.: 5,266,370
Issued: Nov. 30, 1993
Appl. No.: 07/679,862
Filed: Apr. 3, 1991

[51] Int. Cl.[6] ..... B29C 41/04; F16L 9/12; B28B 1/20

[52] U.S. Cl. ..... 428/36.9; 428/36.92; 428/36.1; 428/409; 264/83; 264/311; 138/174; 138/DIG. 7

[58] Field of Search ..... 428/36.9, 36.92, 428/36.1, 409, 34.5, 36.3, 36.4; 264/310, 311, 82.83; 138/DIG. 2, DIG. 7, DIG. 174

[56] References Cited

U.S. PATENT DOCUMENTS

| | | | |
|---|---|---|---|
| 2,333,565 | 11/1943 | Hawk | 25/14 |
| 2,887,728 | 5/1959 | Usab | 264/260 |
| 3,584,105 | 6/1971 | Pekor | 264/236 |
| 3,718,161 | 2/1973 | Woodson | 138/153 |
| 3,754,071 | 8/1973 | Ernst et al. | 264/272 |
| 3,816,582 | 6/1974 | Tennyson | 264/255 |
| 3,988,412 | 10/1976 | Woodson | 264/255 |
| 4,285,903 | 8/1981 | Lemelson | 264/310 |
| 4,380,617 | 4/1983 | Minchak et al. | 526/161 |
| 4,422,991 | 12/1983 | Phillips | 264/83 |
| 4,426,502 | 1/1984 | Minchak | 526/172 |
| 4,468,184 | 8/1984 | Rawlings | 425/73 |
| 4,470,860 | 9/1984 | Gill et al. | 156/175 |
| 4,557,422 | 12/1985 | Gill et al. | 242/1 |
| 4,568,501 | 2/1986 | Wichterle et al. | 264/2.1 |
| 4,705,660 | 11/1987 | DeMarle | 264/311 |
| 4,729,862 | 3/1988 | Salatiello et al. | 264/310 |
| 4,808,364 | 2/1989 | Blunt et al. | 264/310 |
| 4,918,146 | 4/1990 | Matlack | 525/354 |
| 4,988,277 | 1/1991 | Wichterle et al. | 425/435 |
| 4,988,549 | 1/1991 | Meyer et al. | 428/36.91 |

OTHER PUBLICATIONS

Robert Burns, "Getting Started in DCPD RIM Molding" Plastics Technology, vol. 35, No. 3, pp. 62–69, Mar. 1989.

R. Juran (ed.), Modern Plastics Encyclopedia, Issue, vol. 66, No. 11, McGraw–Hill, pp. 892–893,901, Oct. 1989.

*Primary Examiner*—Rena L. Dye
*Attorney, Agent, or Firm*—Michael Best & Friedrich LLP

[57] ABSTRACT

A centrifugally cast plastic pipe comprised of a polymer derived from monomers polymerized in bulk is provided. A pressurized cylindrical mold provides smooth inner and outer surfaces. Pipes with a wall thickness of from ⅛ inch to 3 inches and an outer diameter of 1 inch to 12 feet are provided.

33 Claims, No Drawings

CENTRIFUGALLY CAST PIPE

Matter enclosed in heavy brackets [ ] appears in the original patent but forms no part of this reissue specification; matter printed in italics indicates the additions made by reissue.

BACKGROUND OF THE INVENTION

This invention relates to a centrifugally cast pipe comprised of bulk polymerized polymers.

It is conventional to centrifugally cast thermosetting within the range of 1–12 inches. See U.S. Pat. Nos. 3,981,412, 3,816,582, 3,718,161 and 2,887,728. The pipes formed are generally of a thickness wherein reinforcement with fibers such as fiber glass is desired.

While the pipes obtained from these resins have been satisfactory, the resins used have placed limitations on the processing and the products obtained from centrifugal casting. The viscosity of the resins used has limited the dimensions of the pipe in that spinning large cylindrical shapes becomes more difficult as the viscosity of the resin increases. The wall thickness of the pipes is often limited due to the long cure times or thermosetting resins. Tennyson, U.S. Pat. No. 3,816,582, describes casting times of 6–7 hours for a wall thickness of about 0.050 inch when at room temperature. This cure time can be reduced if higher temperatures are utilized. Fiber reinforcements are often necessary to provide the desired strength and prevent cracking of unreinforced polymers. These fiber reinforcements tend to provide a "wick" for some corrosive materials, allowing the corrosive material to penetrate the surface causing damage not only to the immediate surface but to the subsurface as well.

Polymers obtained by the bulk polymerization of monomers in the absence of solvent are well known. See U.S. Pat. Nos. 4,426,502, 4,380,617 and 4,689,380. The reactive monomer formulations from which these polymers are derived are very low in viscosity, allowing easy transport into molds and other processing equipment. The reactive monomer formulations used in bulk polymerization techniques typically polymerize very rapidly, allowing short cycle times when molding parts within a closed mold. While the use of bulk polymerized polymers does present advantages to centrifugally cast plastic pipe, acceptable pipes have not yet been obtained. The high reactivity makes it difficult for the reactive monomer formulation to obtain a cylindrical shape within the mold prior to gelation. Reactive monomer formulations with delayed gel times do provide adequate time to fill the mold; however, this delay in gel time allows entrapped gas bubbles to coalesce forming imperfections on the inner surface, particularly where the reactive monomer formulation generates a gas during cure.

SUMMARY OF THE INVENTION

It is an object of the present invention to provide improved centrifugally cast plastic pipe comprised of polymers obtained from bulk polymerized monomers.

It is another object of the present invention to provide centrifugally cast plastic pipe comprised or bulk polymerized monomers which his a smooth inner surface, a smooth outer surface and is preferably free of voids.

It is another object of the present invention to provide an improved method of producing plastic pipe by centrifugal casting of a reactive formulation of bulk polymerizable monomers under a pressurized atmosphere.

It is another object of the present invention to provide thick walled plastic pipe which does not require reinforcement.

It is another object of the present invention to provide thick walled plastic pipe by centrifugal casting having a diameter greater than 1 inch and as large as 12 feet Upon further study of the specification and appended claims, further objects and advantages of this invention will become apparent to those skilled in the art.

The above objects are achieved in providing a centrifugally cast plastic pipe with smooth inner and outer surfaces which is comprised of bulk polymerized monomers. These pipes can be obtained by introducing a reactive formulation of bulk polymerizable monomers having a gel time which ranges from about 20 seconds to 12 minutes into a cylindrical mold, spinning the reactive formulation within the cylindrical mold to obtain the cylindrical dimensions of the pipe, pressurizing the cylindrical mold with a gas to a pressure greater than 1 atmosphere for a period sufficient to allow the reactive formulations of bulk polymerizable monomers to complete the reaction exotherm and removing the pipe from the mold when polymerization is complete.

DETAILED DESCRIPTION OF PREFERRED EMBODIMENTS

The present invention utilizes polymers obtained by bulk polymerization. These polymers are formed within the mold during the centrifugal casting process. While any polymer produced by bulk polymerization is suitable for this invention, those which can be obtained from a reactive monomer formulation that completely cures in less than 1 hour are preferred. This provides short molding cycles when manufacturing the pipe. The term "bulk polymerization", as used herein, refers to polymerization in the substantial absence of a solvent or diluent, wherein a catalyst or curing agent is dissolved within the monomer itself ad polymerization yields a solid finished article substantially in final form.

It is preferable that the bulk polymerization polymer exhibit high temperature and chemical resistance as well as high strength and high impact resistance. Polycarbonates and polycycloolefins are examples of such polymers.

Bulk polymerized polycycloolefins are preferred and the preferred polymers within this group comprise dicyclopentadiene monomers. Commercially available two component formulations which comprise bulk polymerizable monomers are Telene® dicyclopentadiene resins, produced by the B. F. Goodrich Company. Another commercially available formulation is Metton® dicyclopentadiene resins, produced by Hercules, Inc.

Other monomers which produce polycycloolefins are those having norbornene functionality which are characterized by the presence of at least one norbornene group and identified by the formula below which can be substituted or unsubstituted.

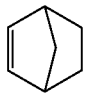

Examples of monomers known in the art include norbornene, dicyclopentadiene, ethylidenenorbornene, norbornidiene, dihydrodicyclopentadiene, trimers of cyclopentadiene, tetramers of cyclopentadiene, tetracyclododecene, methyltetracyclododecene, methylnorbornene, ethylnorbornene, dimethylnorebornene and similar derivatives. These and other monomers are described by Minchalk in U.S. Pat. Nos. 4,380,617 and 4,426,502.

Preferred monomer formulations are those suitable for reaction injection molding (RIM) techniques and resin transfer moldings (RTM) which are forms of bulk polymerization which occur in a closed mold. RIM and RTM differ from the thermoplastic injection molding in that lower pressures are used and lower temperatures are used. The primary distinction between injection molding and RIM/RTM is in the fact that a chemical reaction takes place to transform a monomer to a polymeric state.

The reactive formulations preferably have a gel time in the range of 20 seconds to 12 minutes at about 40° C. The preferred values within this range depend on the size of the pipe and whether it contains reinforcement. For some applications, longer gel times in excess of 10 minutes at 40° C. are desired. The gel time is the time at which the viscosity of the formulation increases to a point where it is difficult to shape the cylinder within the centrifugal mold. i.e., the mold cannot be filled without knit lines or other defects. In addition, it is preferable for the time to exotherm to be relatively short so as to reduce the mold cycle time. A time to exotherm of less than 20 minutes is preferred. The time to exotherm is the point at which the formulation increases rapidly in temperature because of the heat of polymerization.

To initiate polymerization, the reactive monomer formulation contains a curing agent or catalyst which is activated to initiate polymerization. The catalyst may be activated simultaneously with its formation in preparing the reactive monomer formulation by combining two catalyst components just prior to use. Alternatively, a complete catalyst may be dissolved within the monomer and activated by means such as heat or UV radiation. Suitable two component catalysts for the formation of polycycloolefins are described by Minchak in U.S. Pat. Nos. 4,426,502 and 4,380,617, Khasai et al. in U.S. Pat. No. 4,835,230, Nelson in U.S. Pat. No. 4,897,465 and Martin in U.S. Pat. No. 4,918,039.

The formulation may contain conventional additives used to enhance the polymerization reaction as well as additives which enhance the properties of the resultant plastic pipe. Blowing agents may be introduced into the formulation to generate a foam core when activated by the heat of reaction. It may also be desirable to introduce fiber reinforcement for certain applications. Fillers may also be desirable to reduce material costs or enhance the properties of the pipe.

The plastic pipe of the present invention is obtained by introducing a reactive monomer formulation of bulk polymerizable monomers into a cylindrical mold which is preferably spinning within a casting machine (caster). particularly where reinforcement is used. Where the reactive monomer formulation catalyst is derived from two components. It is preferable to premix these components before addition to the cylindrical mold. The reactive formulation preferably has a gel time at 40° C. within the preferred range given above. In addition, the reactive monomer formulation has a time to exotherm in less than 1 hour, preferably less than 20 minutes. It is desirable for the exotherm to be short in duration and small magnitude. This allows flexibility in the equipment utilized. In addition, it allows for short mold cycle times. Preferably, the mold cycle time range from 6–40 minutes, most preferably from 6–12 minutes.

After the reactive monomer formulation is introduced to the cylindrical mode, which is spinning or stationary depending upon whether reinforcement is used, the mold is pressurized with a gas to an internal pressure greater than 1 atmosphere, preferably, greater than 10 psi and most preferably, within the range of 20–60 psi. The pressure is maintained until the exotherm is complete, i.e., the temperature of the reactive monomer formulation starts to decrease.

In certain embodiments, it is preferable to utilize an inert gas such as nitrogen while in other embodiments, it may be desirable to utilize a gas which will react with the unsaturated carbons in the polymer such as fluorine. In the case of fluorine, the interior surface of the pipe will be modified in that the fluorine incorporates into the polymers formed. Other halogen gases such as chlorine and bromine are also suitable. This modification will enhance the chemical resistance of the pipe formed by providing a surface layer with properties that resemble a corrosion resistant fluorinated surface material.

The cylindrical mold is spun to shape the reactive monomer formulation to the cylindrical dimensions defined by the mold, i.e., the outer diameter of the pipe and its length. The inner diameter of the pipe is determined by the amount of active formulation introduced to the mold.

The mold is spun under pressure until the reaction exotherm is complete. Preferably, spinning is continued until the pipe is ready to be removed from the mold. The additional spinning is continued at atmospheric pressure, preferably by venting the molds. The pipe formed is removed from the cylindrical mold once polymerization is complete.

The pipe formed will have smooth inner and outer surfaces. Smooth inner surfaces are obtained because the pressurization prevents entrapped as from escaping from the reactive monomer formulation during reaction. Preferably, the number of voids in the inner surface are as few as the number of voids in the outer surface. Such a pipe is substantially uniform in composition and any voids should not be the result of bubble formation. In these preferred embodiments the inner surface has less than one void per square inch. Most preferably, the inner surface has no visible voids.

The plastic pipe of this invention can vary widely in length. Preferred lengths are from about 4–20 feet. The pipes of this invention can also vary widely in wall thickness as well. Thicknesses ranging from ⅛ inch to 3 inches are suitable in that the reactive formulation can be easily distributed since it is low in viscosity and heat need not be introduced to initiate the polymerization. Furthermore, the inner surface need not be uniform in diameter since the pipe couplings and connectors can be adapted to fit the uniform outer diameter. When producing pipes of a thickness in the range of 3 inches, it is preferable to utilize reactive monomer formulations with small and rapid exotherms so as not to ignite the material by the heat of the reaction.

The pipes of this invention can also range widely in diameter. The pipes have a uniform outer diameter defined by the cylindrical mold. This can range from 1 inch to 12 feet. Pipes of a diameter outside of this range are also possible with the appropriate equipment.

The diameter of the pipe is limited by the viscosity of the reactive formulation and the rpm of the molding machine. In preparing a 4 inch pipe of ½ inch wall thickness an rpm in the range of 800–2,000 is preferred and is most preferably about 400–900 if non-reinforced, and 1,500–2,000 if reinforced, partly for formulations comprised of dicyclopentadiene monomers. The optimum rpm will vary with the formulation, its viscosity, the size of the desired pipe and whether reinforcement is used.

Without further elaboration, it is believed that one skilled in the art can, using the preceding description utilize the present invention to its fullest extent. The following preferred specific embodiments, are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications, cited above and below, are hereby incorporated by reference.

EXAMPLES

EXAMPLE 1

A centrifugal pipe caster fitted with a cylindrical mold about 4 feet long with a 4 inch inner diameter is used in this example. The cylindrical mold is fitted with end caps that provide a gas tight seal. Swivel feeds are incorporated into each end cap. One feeds the reactive monomer formulation, the other feeds a gas. The cylindrical mold is spun at about 850 rpm. The two component reactive monomer solution of bulk polymerizable monomer (trade designation TELENE® sold by the B. F. Goodrich Co.) is mixed and fed into the spinning cylindrical mold from a reaction injection molding machine at a continuous rate of about 0.4 lbs. per second at a injection pressure of 1,050 psi. The total shot time was about 16.85 seconds. The amount of material fed into the cylindrical mold is enough to provide a ¼ inch wall. The reaction injection molding machine mixes components A and B of the TELENE® dicyclopenta-diene resins formulation.

There is no pressure in the mold while feeding the reactive monomer formulation into a mold through the end caps; however, after the material is introduced, the mold is pressurized to 30 psi nitrogen through the opposing end cap.

The reactive formulation experiences exotherm at about 2 minutes, 48 seconds. The caster is then stopped at 10 minutes, 12 seconds, the nitrogen pressure released and the interior of the mold is left open to the atmosphere by removing the end caps.

The caster is started up again after about 2 minutes with the interior of the cylindrical mold is vented into the atmosphere. The caster is stopped after about 20 minutes from the initial feeding of the reactive monomer formulation and the pipe is separated from the mold. No holes appear on the outside surface and few, if any, very tiny holes are found on the inside surface.

COMPARATIVE EXAMPLE

Utilizing the same equipment and cylindrical mold as in example 1, a reactive formulation of TELENE® is fed into the cylindrical mold, spinning at about 850 rpm. The total shot time is 16.85 seconds at a rate of about 0.4 pounds per second with an injection pressure of1,050 psi. Enough material is fed to the cylindrical mold to provide a ¼ inch wall thickness.

No pressure is applied in the mold while introducing the reactive monomer formulation or thereafter.

The reactive formulation exotherms at about 3 minutes, 20 seconds and after about 10 minutes, the caster is stopped and the interior of the cylindrical mold was vented to the atmosphere by removing the end caps. The caster is started back up after about 2 minutes with the cylindrical mold still vented to the atmosphere. The caster is stopped after 15 minutes, 20 seconds from the initial feeding of the reactive monomer formulation.

The part is removed from the mold shortly thereafter. Small holes are detected on the outside surface and large air bubbles or voids are detected on the inside surface.

The preceding examples can be repeated with similar success by substituting the generically or specifically described reactants and/or operating conditions of this invention for those used in the preceding examples.

From the foregoing description one skilled in the art can easily ascertain the essential characteristics of this invention, and without departing from the spirit and scope thereof, can various changes and modifications of the invention to adapt it to various usages and conditions.

What is claimed is:

1. A centrifugally cast plastic pipe with inner and outer surfaces having less thin one visible void to the unaided eye per square inch of surface caused by bubble formation having an outer diameter in the range of 2 inches to 12 feet and a wall thickness ranging from about ¼-inch to about 3 inches which is comprised of bulk-polymerized dicyclopentadiene.

2. A pipe as in claim 1, which does not contain reinforcement fibers embedded therein.

3. A pipe is in claim 1, having a modified inner surface by reaction with a gas selected from fluorine, bromine and chlorine.

4. A pipe as in claim 1 which is threaded.

5. A centrifugally cast plastic pipe with no voids on the inner and outer surfaces visible to the unaided eye from bubble formation having a wall thickness ranging from about ¼-inch to about 3 inches and an outer diameter ranging from about 2 inches to 12 feet, which is comprised of bulk-polymerized dicyclopentadiene.

6. A pipe as in claim 5, having a modified inner surface by reaction with a gas selected from fluorine, bromine and chlorine.

7. A centrifugally cast plastic pipe with no voids on the inner and outer surfaces visible to the unaided eye from bubble formation, which contains fiber mat reinforcement and is comprised of bulk-polymerized dicyclopentadiene.

8. A pipe as in claim 7, having a modified inner surface by reaction with a gas selected from fluorine, bromine and chlorine.

9. A centrifugally cast plastic pipe with inner and outer surfaces having less than one visible void to the unaided eye per square inch of surface caused by bubble formation having an outer diameter of from about 4 inches to about 12 feet, which is comprised of bulk-polymerized dicyclopentadiene.

*10. A centrifugally cast plastic pipe with inner and outer surfaces having less than one visible void to the unaided eye per square inch of surface caused by bubble formation having an outer diameter in the range of 2 inches to 12 feet and a wall thickness ranging from about ¼-inch to about 3 inches, which is comprised of bulk-polymerized dicyclopentadiene, wherein the pipe is produced by the process of centrifugally casting a reactive monomer formulation of bulk polymerizable monomer under a pressurized atmosphere.*

*11. A pipe as in claim 10 wherein the pressurized atmosphere is greater than 10 psi.*

*12. A pipe as in claim 10 wherein the pressurized atmosphere is within the range of 20 to 60 psi.*

*13. A pipe as in claim 10 wherein the reactive monomer formulation is introduced into a cylindrical mold and the*

*mold is subjected to a pressurized atmosphere greater than one atmosphere.*

*14. A pipe as in claim 13 wherein the reactive monomer formulation has a gel time greater than about 2 minutes and a time to exotherm of less than 20 minutes and wherein the mold is subjected to the pressurized atmosphere for a period of time sufficient to allow the bulk polymerizable monomer to complete the reaction exotherm.*

*15. A pipe as in claim 14 wherein the reactive monomer formulation within the mold is spun until polymerization is complete and to obtain the cylindrical dimensions defined by the cylindrical mold.*

*16. A pipe as in claim 15 wherein the cylindrical mold is spun prior to introducing the reactive monomer formulation.*

*17. A pipe as in claim 15 wherein the gas used to pressurize the mold is selected from the group of nitrogen, fluorine, bromine and chlorine.*

*18. A pipe as in claim 15 wherein the cylindrical mold is spun at a speed greater than 800 rpm, the bulk polymerizable monomer comprises dicyclopentadiene, and the cylindrical mold defines a 4 inch diameter pipe.*

*19. A pipe as in claim 15 wherein the cylindrical mold is pressurized to 30 psi.*

*20. A pipe as in claim 15 wherein the reactive monomer formulation includes a blowing agent which is activated from the heat of the reacting exotherm.*

*21. A pipe as in claim 15 wherein a fiberglass reinforcement is introduced to the cylindrical mold prior to introduction of the reactive monomer formulation.*

*22. A centrifugally cast plastic pipe with inner and outer surfaces having less than one visible void to the unaided eye per square inch of surface caused by bubble formation having an outer diameter of from about 4 inches to about 12 feet, which is comprised of bulk-polymerized dicyclopentadiene, wherein the pipe is produced by the process of centrifugally casting a reactive monomer formulation of bulk polymerizable monomer under a pressurized atmosphere.*

*23. A pipe as in claim 22 wherein the pressurized atmosphere is greater than 10 psi.*

*24. A pipe as in claim 22 wherein the pressurized atmosphere is within the range of 20 to 60 psi.*

*25. A pipe as in claim 22 wherein the reactive monomer formulation is introduced into a cylindrical mold and the mold is subjected to a pressurized atmosphere greater than one atmosphere.*

*26. A pipe as in claim 25 wherein the reactive monomer formulation has a gel time greater than about 2 minutes and a time to exotherm of less than 20 minutes and wherein the mold is subjected to the pressurized atmosphere for a period of time sufficient to allow the bulk polymerizable monomer to complete the reaction exotherm.*

*27. A pipe as in claim 26 wherein the reactive monomer formulation within the mold is spun until polymerization is complete and to obtain the cylindrical dimensions defined by the cylindrical mold.*

*28. A pipe as in claim 27 wherein the cylindrical mold is spun prior to introducing the reactive monomer formulation.*

*29. A pipe as in claim 27 wherein the gas used to pressurize the mold is selected from the group of nitrogen, fluorine, bromine and chlorine.*

*30. A pipe as in claim 27 wherein the cylindrical mold is spun at a speed greater than 800 rpm, the bulk polymerizable monomer comprises dicyclopentadiene, and the cylindrical mold defines a 4 inch diameter pipe.*

*31. A pipe as in claim 27 wherein the cylindrical mold is pressurized to 30 psi.*

*32. A pipe as in claim 27 wherein the reactive monomer formulation includes a blowing agent which is activated from the heat of the reacting exotherm.*

*33. A pipe as in claim 27 wherein a fiberglass reinforcement is introduced to the cylindrical mold prior to introduction of the reactive monomer formulation.*

* * * * *